Figure 1:
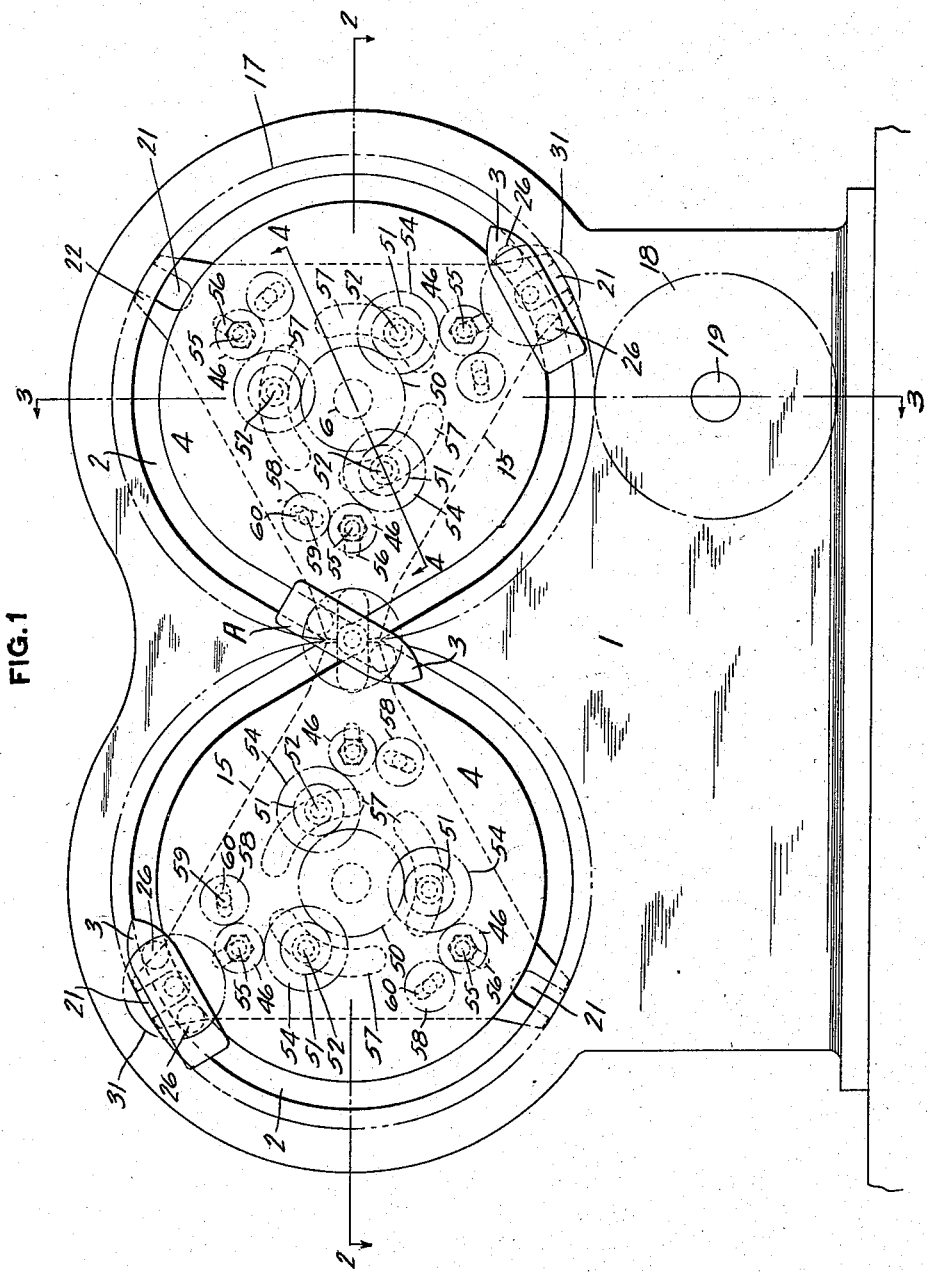

F. L. O. WADSWORTH.
MACHINE FOR MAKING GARMENT STAYS.
APPLICATION FILED FEB. 19, 1915.

1,212,857.

Patented Jan. 16, 1917.
4 SHEETS—SHEET 1.

WITNESSES

INVENTOR

F. L. O. WADSWORTH.
MACHINE FOR MAKING GARMENT STAYS.
APPLICATION FILED FEB. 19, 1915.
1,212,857.
Patented Jan. 16, 1917.
4 SHEETS—SHEET 2.
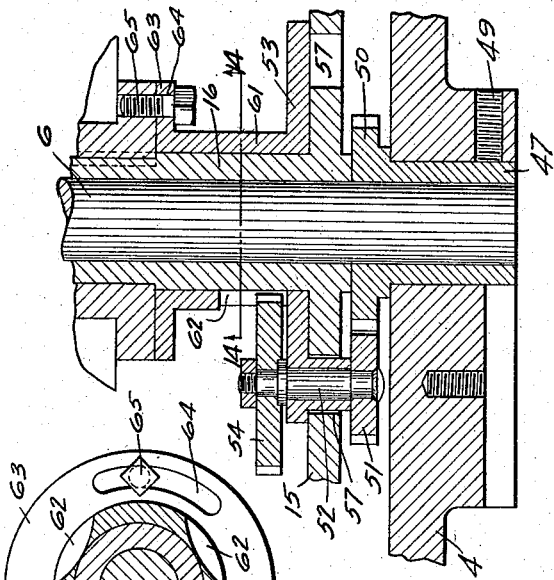
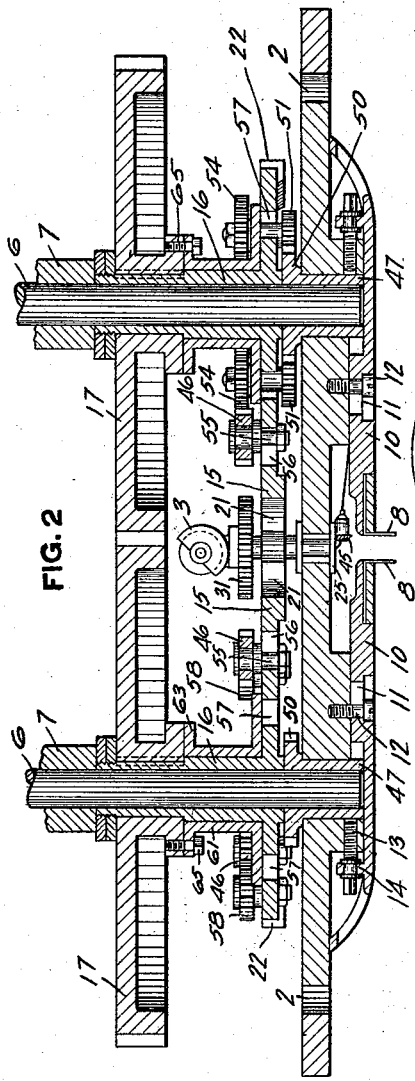
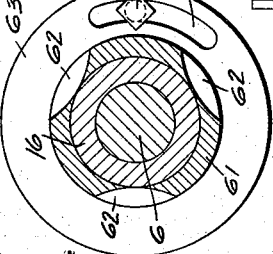
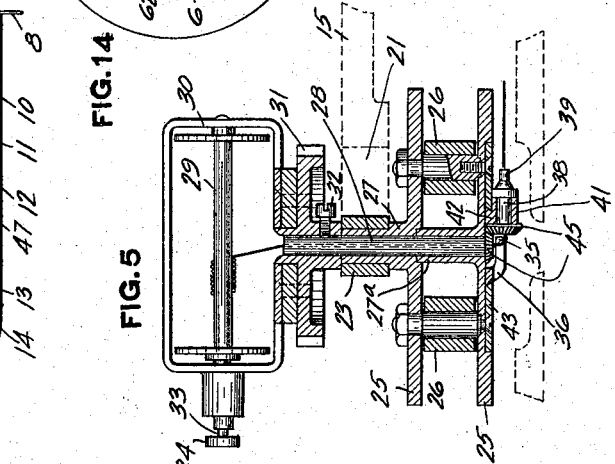
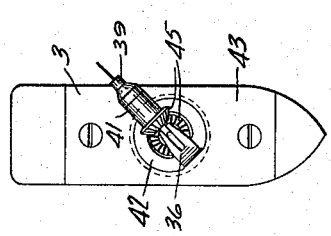
WITNESSES
INVENTOR
F. L. O. Wadsworth F. L. O. WADSWORTH.
MACHINE FOR MAKING GARMENT STAYS.
APPLICATION FILED FEB. 19, 1915.
1,212,857.
Patented Jan. 16, 1917.
4 SHEETS—SHEET 3.
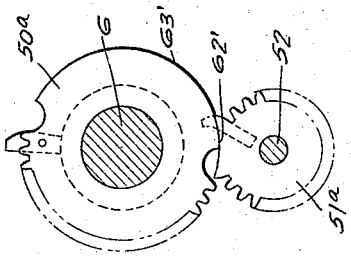
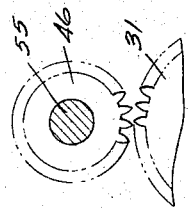
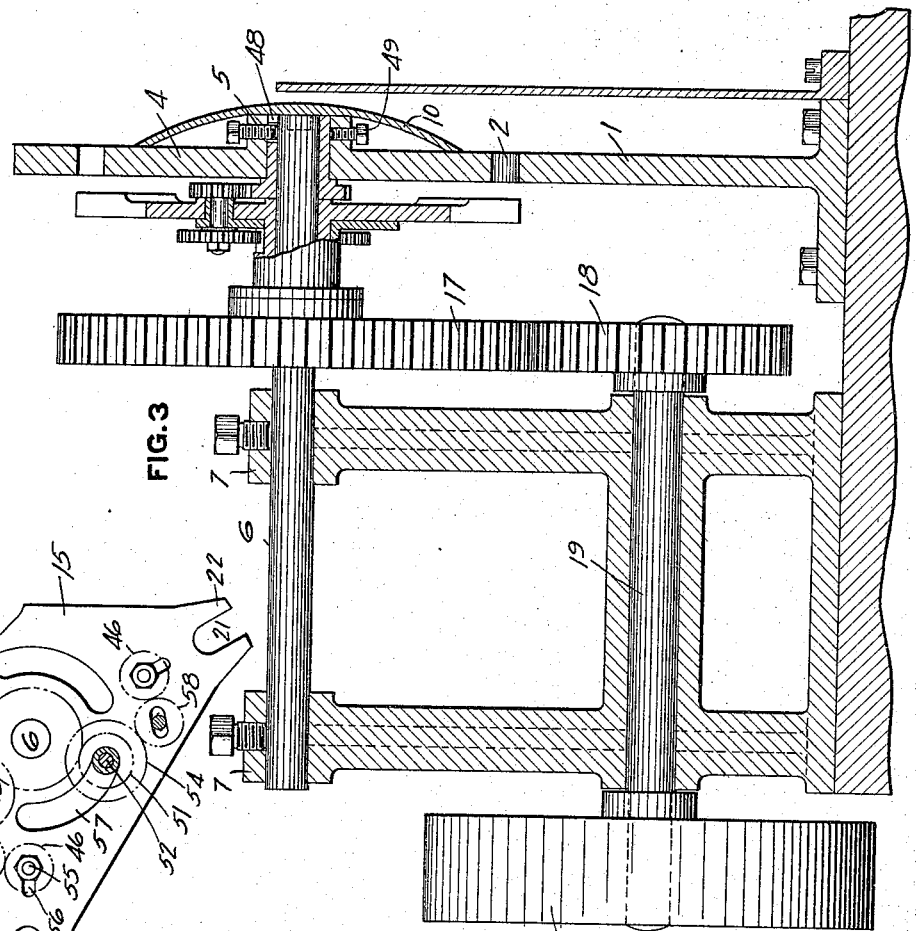
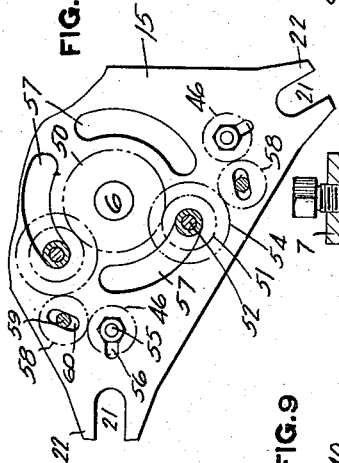
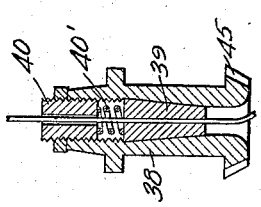
WITNESSES
INVENTOR F. L. O. WADSWORTH.
MACHINE FOR MAKING GARMENT STAYS.
APPLICATION FILED FEB. 19, 1915.

1,212,857.

Patented Jan. 16, 1917.
4 SHEETS—SHEET 4.

WITNESSES
INVENTOR

UNITED STATES PATENT OFFICE.

FRANK L. O. WADSWORTH, OF PITTSBURGH, PENNSYLVANIA, ASSIGNOR TO THE SPIRELLA COMPANY, A CORPORATION OF PENNSYLVANIA.

MACHINE FOR MAKING GARMENT-STAYS.

1,212,857. Specification of Letters Patent. Patented Jan. 16, 1917.

Application filed February 19, 1915. Serial No. 9,431.

*To all whom it may concern:*

Be it known that I, FRANK L. O. WADSWORTH, a resident of Pittsburgh, in the county of Allegheny and State of Pennsylvania, have invented a new and useful Improvement in Machines for Making Garment-Stays, of which the following is a specification.

This invention relates to wire bending apparatus, and particularly to machines for forming wire garment stays.

The invention is an improvement upon the machine described and shown in the patents to John R. Dean for wire bending machine, No. 977,515, December 6, 1910, and No. 1,113,104, October 6, 1914. Said patents show a machine embodying wire coil carrying shuttles which are caused to traverse a figure-8 path to bend the wire around two stationary loop-forming pins into figure-8 coils or convolutions, which are then pressed down into flat stay form.

It is well known that when wire is twisted in one direction to an amount sufficient to impart a permanent torsional set thereto, said wire has then a greater ability to resist twisting or torsional strains in the direction which increases the twist already imparted thereto, than it has to resist a twist in the opposite direction. This property may be taken advantage of to increase the resistance to bending of wire garment stays, by subjecting certain portions of the wire, such as the transverse or crossing portions, to torsion when the stay is formed. By twisting the wire which forms the transverse or crossing portions of the stay in the proper direction, the ability of the stay to resist bending strains which produce a further twist in the crossings is increased.

The object of the present invention is to provide a machine of the general type shown in the Dean patents above referred to, wherein, as the wire is coiled around the loop-forming pins it can be twisted so as to impart a definite permanent torsion thereto for the purpose of regulating the resistance of the stay as a whole to bending strains.

A further object of the invention is to provide a machine of the class described provided with various adjustments, or otherwise so arranged that the wire may be twisted in either direction to any amount, and may also be twisted either in the same or in opposite directions in different parts of the stay.

Further objects of the invention are in part obvious and in part will appear more in detail hereinafter.

The invention comprises the wire bending apparatus hereinafter described and claimed.

Figure 12:
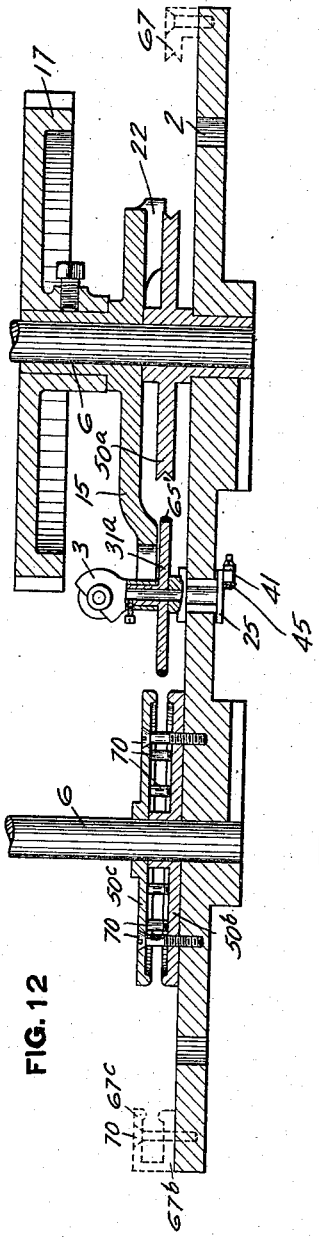
Figure 11:
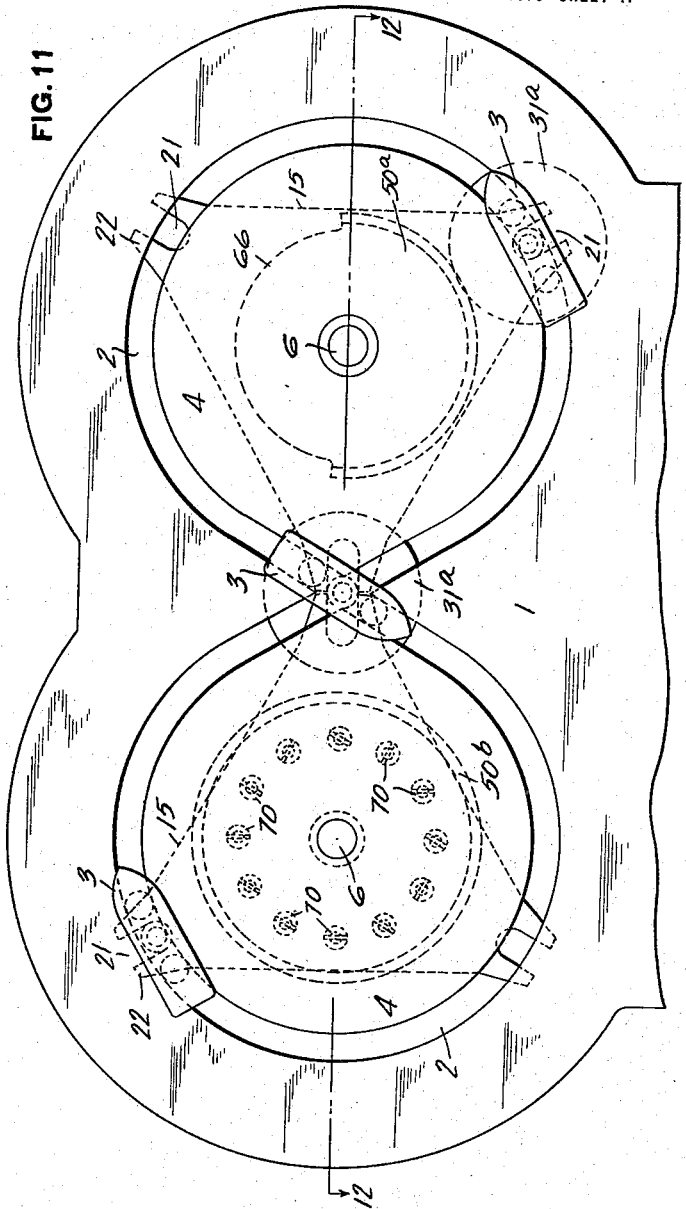
Figure 13:
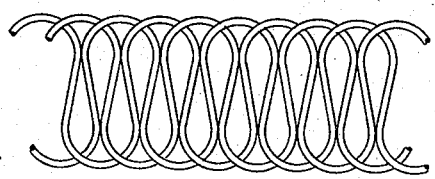

In the drawings, Figure 1 represents a front view of a machine embodying the invention; Fig. 2 is a horizontal section on the line 2—2, Fig. 1, certain parts being omitted; Fig. 3 is a sectional elevation on the line 3—3, Fig. 1; Fig. 4 is a detail section on a larger scale, taken on the line 4—4, Fig. 1; Fig. 5 is a detail sectional view, illustrating one of the shuttles as it passes the crossing in the guideway; Fig. 6 is a front view of one of the shuttles, and illustrating the oscillating wire guiding nose and tension member; Fig. 7 is a detail view of the shuttle operating gearing; Fig. 8 is a detail view of a gear supporting plate, showing a modification of the arrangement of parts shown in Fig. 1; Fig. 9 is an enlarged sectional view of the wire guide; Fig. 10 is a detail view, showing a modified form of a shuttle operating gearing; Fig. 11 is a front elevation of another form of machine embodying the invention; Fig. 12 is a horizontal section thereof on the line 12—12, Fig. 11; Fig. 13 is a plan view of one form of stay produced on these machines; and Fig. 14 is a cross section on the line 14—14, Fig. 4.

In many respects the machine of this application is similar to the machines of the Dean patents before referred to and as to like features thereof, it will not therefore, require full detailed description. The main frame of this machine comprises a suitable base, to which is bolted a stationary face plate 1 having a figure-8 opening therein; and two ovoid guide plates 4 which are rigidly attached, as by the screws 5, to the outer end of two parallel stationary shafts or journals 6, carried in boxes or bearings 7 on the base plate. The guide plates 4 are so shaped and are so adjusted on the shafts 6, that their outer edges form, in conjunction with the opposing inner edges of the figure-8 opening in the face plate 1, a continuous parallel sided slot or raceway 2 for the guidance of the shuttles 3. The guide plates 4 are also preferably so adjusted that their outer faces lie in the same plane as the front surface of the main face plate 1.

The plates 4 form supports for two loop-forming pins 8 which project outwardly from the front of the machine on either side of the crossing in the guideway, and which are mounted on slotted bars 10 that slide in grooves cut in the outer faces of the plates 4 and are secured thereto by means of screws 12 and 13. The elongated slots 11 enable the pin bars 10 to be adjusted toward and from each other, to vary the distance between the loop-forming pins 8, by the use of the screws 13 which are threaded into bosses on the plates 4 and are journaled in ends of the pin bars 10, as at 14.

Any suitable number of shuttles 3 may be employed, depending upon the number of wires in the stay that is being fabricated. The present machine is arranged to form a three-wire stay, such as shown in Fig. 13, and three shuttles are therefore necessary. Said shuttles are caused to move along the figure-8 guideway by driving members 15, said members being in the form of triangular plates attached to or forming part of sleeve members 16 that are rotatable on the stationary shaft 6 and are provided with large interengaging driving gears 17, one of which is driven by a gear 18 on a longitudinally extending shaft 19 journaled in the frame and provided with suitable means for driving the same, such as the belt pulley 20. In this arrangement the two driving members 15 rotate constantly in opposite directions. They are provided with deep notches 21 spaced regularly around the axes of rotation and forming three pairs of driving arms 22; the driving gears being so adjusted and engaged that the notches 21 and driving arms 22 of both members 15 pass the crossing in the raceway 2 at the same time.

The shuttles 3 are driven by the engagement of rollers 23 in the notches between the arms 22 of the driving members, and are caused to shift from one driving member to the other as they pass the crossing in the guideways, in the manner explained in the Dean Patent No. 1,113,104. The major portion of each loop of the figure-8 guideway is a circle concentric with the axis of one of the shafts 6, but the intersecting portions at the crossing are straight. Consequently, each roller 23 of the shuttles 3 is held in fixed radial position with respect to one driving member 15 while it traverses the circular portion of one loop in the guideway; but when it reaches the straight portion of the guideway it begins to pass radially outwardly from the notch 21 in the member 15 which is then driving it, and to approach the adjacent notch in the second member 15. When the shuttle has reached the crossing, as shown at A, Fig. 1, the roller 23 of said shuttle is partly engaged by the opposing notches in both driving members. As the shuttle continues on its path its driving roller 23 continues to move away from the axis of the first driving member, and toward the axis of the second; and when it reaches the curved portion of the second loop in the raceway 2, it has fully entered a notch in the second driving member. This action takes place continuously with each shuttle, said shuttles traveling successively around the figure-8 track and shifting alternately from one to the other of the two driving members as they pass from one loop of the raceway to the other.

As explained in the before-mentioned Dean patents, the above-described movements of the shuttles coil or bend the wire in figure-8 coils or convolutions around the two loop-forming pins 8,—each loop being coiled on one of said pins behind or underneath the previous loop,—the succession of figure-8 coils passing off from the free ends of said pins to suitable mechanism for drawing them out and pressing them down into flat stay form.

In the present machine the wire-carrying shuttles are so arranged and are so operated as to impart a predetermined and controllable torsional twist and set to the wire as it is bent around each loop-forming pin. The construction of one of said shuttles is illustrated in detail in Fig. 5. It comprises two parallel plates 25, whose edges overlap the edges of the plates 1 and 4, and between which are journaled antifriction guide members, such as rollers 26, which engage with the edges of the raceway 2. Each of these plates has a central boss or projection 27, $27^a$, the first of which serves as a support for the antifriction roller 23 that is engaged by the notches 21 in the driving members 15 for traversing the shuttles about the figure-8 raceway. The two rollers 26 which travel in the guideway keep the shuttles properly alined at all times with the raceways and prevent them from turning or jamming therein. A hollow shaft 28 is journaled in the central bosses 27, $27^a$ and carries at one end a suitable frame 30 in which is detachably mounted the wire spool 29. In the construction shown the frame is secured to a gear 31 which in turn is fixedly connected, as by a screw 32, to the shaft 28. One end of the spool 29 engages a fixed portion of the frame 30, while the other engages a spring-pressed pin 33, which is provided with a head 34 for withdrawing the same in order to detach the spool for refilling, as will be readily understood. The wire passes from the spool 29 up through the hollow shaft 28 and then over the rounded end 35 of a slotted bridge 36 that is attached to a circular rotatable plate 42. The wire is then led through a hollow nose 38 provided with suitable tension means therein for retarding the wire, such as the chuck jaws 39, which are held in adjustable frictional contact with the wire by a suitable means, such as the threaded stud 40 and spring 40'. The nose 38 is journaled in a boss 41 on the plate 42, the beveled edges of which are engaged by the undercut edges of a plate 43 screwed to the front of the shuttle, so that the plate 42 and the hollow nose 38 carried thereby can be rotated on the shuttle plate around the axis of the shaft 28. This permits the wire guiding nose 38 to change its angular position—under the pull of the wire on the pins 8 as the shuttle traverses the figure-8 path; and to thus prevent any bending or kinking of the wire as it passes from the nose 38 to the pins 8.

The wire is twisted to impart a permanent torsional set thereto, while bending or coiling it around the loop-forming pins, by rotating the wire supporting and guiding means on their axial mountings during the movement of the shuttles along the figure-8 raceway. The rotation of the wire spool support may be produced in various ways, for example, by suitable means arranged to engage and operate the gear 31 or an equivalent member to thereby turn the spool frame 30 and shaft 29 in the shuttle frame. Such means may either be a stationary member around which the gear 31 travels in a planetary path, or it may be a positively rotated member which turns in either direction, according to the direction of twist which it is desired to impart to the wire. In either case rotation of the spool frame twists that portion of the wire between the spool and the bridge support 36, and this twist is carried around the rounded bridge guide 35 to that portion of the wire between the hollow shaft 28 and the pins 8. To insure a full twist to all of the unformed portion of the wire between the spool and loop-forming pins the shaft 28 and hollow nose 38 are preferably inter-geared, as by the bevel gears 45, so that both rotate together whenever the spool frame is rotated. The jaws 39 of the rotating nose 38 then act as a clutch to grip the wire and assist in twisting it between the shaft 28 and loop-forming pins.

In the machine shown in Figs. 1 and 2 each spool frame is rotated by the alternate engagement of the gear 31 with two gears 46 carried by the driving members 15 and operated by the turning movement of said members around shafts 6. Each driving member 15 carries three sets of such gears 46, one for each shuttle, and as they are all arranged and operated in the same way, except as hereinafter described, it will only be necessary to describe one thereof. As shown in Figs. 3 and 4, the shaft 6 carries at one end a sleeve 47 which is provided with a short annular slot 48 through which the clamping screw 5 passes to enable said sleeve to be rotatably adjusted on the shaft without disturbing the plate 4. Said sleeve is clamped to the plate 4 by a screw 49. One end of said sleeve carries a stationary gear 50 around which travels a planetary gear 51 fixed to a short shaft 52 that is journaled in a boss on a frame 53, and carries at its upper end a gear 54, which meshes with and drives the gear 46.

The teeth of the gears 46 and 31 are pointed, as shown in Fig. 7, so that as each shuttle moves toward the axis of a driving member 15, said gears will engage without liability of the teeth meeting end to end and locking on each other. As each shuttle travels around the circular portion of one of the loops of the raceway the train of gears 50, 51, 54, 46, 31 rotates the spool frame and guiding nose and thereby twists the unformed portion of the wire between the shuttle and loop-forming pins. If all of the trains of gearing between the fixed gear 50 and the operating gears 46, are arranged in the same order, the wire from each shuttle will be twisted in opposite directions as the shuttle traverses the two loops of the figure-8 guideway. This twist is distributed throughout the entire length of the unformed portion of the wire, but only a portion of the twist is permanently retained in the fabricated stay; namely, the twist in the short section of wire which extends between the two pins 8 and which forms a crossing portion of the finished article. Each time a loop is bent around one of the loop-forming pins the twist in the crossing portion is set or fixed in the wire, and as the shuttle proceeds in its movement in the raceway the twist remaining in the unformed portion of the wire is first taken out and said wire is then given an additional twist in the opposite direction. Another crossing portion is then formed and the new twist is fixed or set therein in the same manner as before.

The mechanism is so arranged as to enable any amount of twist to be imparted to the wire by a single complete rotation of a driving member 15 around the shaft 6. In the form of construction shown in Figs. 1 to 9, the amount of this twist is varied by the following means: The gears 31 and 54 are both detachably secured to their respective shafts 28 and 52 and the gears 46 are mounted on short stud shafts 55 that can be adjusted in radial slots 56 in the driving members 15. These members are also provided with arcuate slots 57 in which the bosses of the frames 53, which carry the stub shafts 52 and the gears 51 and 54 thereon, can move circumferentially around the axes of the shafts.

The frame 53, as shown, has a sleeve portion 61 surrounding the sleeve 16 of the driving member 15. This sleeve 61 is cut away, as shown at 62, to accommodate large sizes of gears 54. It is also provided with a flange 63 having an arcuate slot 64 therein to receive a clamping screw 65 threaded into the hub of the gear 17, so that the frame 53 may be securely clamped in any adjusted position in which it is placed with respect to the corresponding driving member 15.

By changing the size of one or both of the gears 31 and 54 of each driving train, and correspondingly adjusting the positions of the gear axes 55 and 52, so as to secure proper operative engagement of the said gears with the intermediate gears 46, any desired gear ratio between the gear 50 and the gear 31 may be obtained; and in this way any amount of rotation of the spool frames may be produced during each rotation of the shuttle around the shafts 6.

The arrangement just described permits the spool frames to be rotated in either direction as they traverse the figure-8 guide path. As shown, each of the gears 46 meshes with an idle gear 58 journaled on a short stub shaft 59 that is adjustably mounted in a circumferential slot 60 in the driving member 15. These idle gears 58 are so disposed that by turning the frame 53 each gear 54 may be disengaged from the gear 46 of its own set and engaged with the idle gear 58 of the next adjacent set of gearing, as shown in the detail view, Fig. 8. The effect of this is to interpose an extra idle gear in the chain of gearing between the gears 50 and 31 and therefore reverse the direction of rotation of the spool frame as the shuttle travels around each stationary gear 50.

There are three possible arrangements of the trains of gearing between the gears 31 and 50. The first arrangement is that above described in which the gears 54 are engaged directly with the gears 46. This will twist successive portions of the wire in opposite directions as the shuttles move successively around the two loops of the figure-8 raceway. The second arrangement is that in which the gears 54 engage with the gears 46 through the interaction of the idler gears 58. With this arrangement successive crossing portions of the wire will also be twisted in opposite directions, but said twists will be the reverse of what they would be with the arrangement first described. The third arrangement is one in which the gears 54 on one driving member engage directly with the gears 46, and on the other driving member they are engaged with the idler gears 58. In this case the wire will be twisted constantly in the same direction as the shuttles traverse the two loops of the raceway.

Any of these arrangements can be used, depending upon the particular function or effect which is to be produced in the stay.

In the constructions illustrated in Figs. 1 to 9, the fixed driving gears 50 on the shafts 6 are complete gears,—i. e., they are provided with teeth around their entire periphery—and the movements of the gear trains 51—54—(58)—46 are continuous and concurrent with the rotations of the driving members 15, 15. In this construction the shuttles begin to rotate as soon as the gears 31 thereon come into operative engagement with the gears 46 on the driving members 15 and they continue to rotate during the entire movement of the shuttles in the circular portions of the raceway. But in some cases it is desirable to confine the rotary movements of the wire-carrying parts to certain definite points or arcs of the shuttle travel, and in order to accomplish this I use the so-called "mutilated" or "interrupted" gear drive shown in Fig. 10. In this modification the periphery of each of the gears 51$^a$ is provided with a concave locking segment 62', which engages and coöperates with the smooth portion 63' of the gear 50$^a$, so as to hold the gear trains 51$^a$—54—(58)—46 against rotary movement while the driving arms 15 are moving through the arc embraced by the smooth segment of the gear 50$^a$. This arc of rest may be adjusted to correspond to any part of the circular path of movement of the shuttles by rotating the gear 50$^a$ on the shaft 6 and securing it in the desired position thereon by means of the screw 49.

Figs. 11 and 12 show a modified form of the machine in which the spool frame is rotated by friction instead of by a positive gear drive, the driving mechanism being also simplified. In this construction the spool frame is connected to and rotates with a frictional wheel 31$^a$, the periphery of which is covered with some suitable clinging material, such as leather or the like, as indicated at 65'. When this shuttle reaches the circular portion of the figure-8 guideway the periphery of the friction wheel 31$^a$ is in full contact with a groove or channel in the periphery of a stationary driving wheel 50$^a$ surrounding the shaft 6. As long as the wheels 31$^a$ and 50$^a$ remain in contact the spool frame is rotated and the unformed portion of the wire is twisted. If it is desired to confine the rotation to a particular part of the circular movement of the shuttles, the periphery of the wheel 50$^a$ may be cut away in part, as indicated by the dotted line 66. When it is desired to rotate the spool frame in the contrary direction to that just described, an internal stationary driving member 67 is placed on the outside of the figure-8 guideway. The inner periphery of said member is grooved or channeled like the other periphery of the wheel 50ª and when in contact with the disk 31ª serves to rotate it in the same manner but in the opposite direction to that in which it is rotated by the wheel 50ª. Figs. 11 and 12 also show at the left a slightly different form of driving means for rotating the spool frames as the shuttles travel about the left-hand loop of the figure-8 guideway. In this case the external driving member, corresponding to the wheel 50ª, consists of two plates 50ᵇ and 50ᶜ having beaded or flanged peripheral portions which face each other and which pinch or hug the edge portion of the pulley 31ª as it travels around the same. These two plates are clamped directly to one of the supplemental plates 4, and are therefore stationary. The internal driving member for rotating the spool frames in the opposite direction may also be of a similar type, as shown at 67, 67ᶜ. With friction driving disks of this last type, the arc of driving engagement between the member 31ª and the members 50ᵇ—50ᶜ, and 67ᵇ—67ᶜ, may be varied at will by tightening a greater or lesser number of the clamp screws 70 which hold the upper and lower elements of the driving disks in operative engagement with the edges of the wheel 31ª. In the construction of Figs. 11 and 12 the driving disks may also be so formed and adjusted that the shuttles will be rotated in one direction during their passage around one portion of each circular loop of the raceway 2, and then rotated in the opposite direction during their travel over the remainder of the same loop. One advantage, in some cases, of the last described mode of operation is that, when successive portions of the wire are to be twisted in opposite directions, the renewal of the unset twist, preliminary to the imposition of the reverse twist, may be effected a little sooner than it can be when the reversal of shuttle movement is delayed each time until after said shuttle has crossed the central intersection of the figure-8 raceway.

The machine described produces a bent wire stay formed of one or a plurality of wires which may be interlocked if desired, and which may also have a predetermined torsional twist imparted to the crossing portions thereof to increase the resistance of the stay to bending strains in either one or both directions. This twist may be in opposite directions or in the same direction in successive crossings and may be varied at will by the means described.

What I claim is:—

1. Wire bending apparatus, comprising loop-forming pins, a wire-carrying shuttle movable in a path to coil the wire around said pins, and means for twisting the unformed portion of the wire while coiling the same.

2. Wire bending apparatus, comprising loop-forming pins, a wire-carrying shuttle, means for moving said shuttle in a path to coil the wire around said pins, and means for twisting the unformed portion of the wire as it is coiled around said pins.

3. Wire bending apparatus, comprising loop-forming pins, a wire-carrying shuttle, means for moving said shuttle to coil the wire around said pins into loops or eyes and crossing portions, and means for twisting the last formed crossing portion of the wire as the latter is coiled around said pins.

4. Wire bending apparatus, comprising loop-forming pins, a wire-carrying shuttle, means for moving said shuttle in a figure-8 path around said pins, and means for twisting the unformed portion of the wire while coiling it around said pins.

5. Wire bending apparatus, comprising loop-forming pins, a plurality of wire-carrying shuttles, means for moving said shuttles successively around a path to coil the wires carried thereby successively around said pins into figure-8 coils, and means for twisting the unformed portion of each wire as it is coiled around said pins.

6. Wire bending apparatus, comprising loop-forming pins, a wire-carrying shuttle, means for moving said shuttle to coil the wire around said pins, and means for twisting the unformed portion of the wire between said shuttle and pins to impart a permanent torsional set thereto.

7. Wire bending apparatus, comprising loop-forming pins, a wire-carrying shuttle, means for moving said shuttle around said pins to form loops or eyes and connecting crossings, and means for twisting the unformed portion of the wire between said shuttle and pins to impart a permanent torsional set to the crossing portions of the wire.

8. Wire bending apparatus, comprising loop-forming pins, a shuttle arranged to carry a coil of wire, means for moving said shuttle around said pins, and means for rotating said wire coil as the shuttle travels around said pins to impart a permanent torsional set to the wire.

9. Wire bending apparatus, comprising loop-forming pins, a shuttle arranged to carry a coil of wire, means for moving said shuttle around said pins, and means for rotating said coil about an axis normal to the plane of movement of said shuttles for imparting a permanent torsional set to the wire.

10. Wire bending apparatus, comprising loop-forming pins, a shuttle, a wire carrying reel on said shuttle, means for moving the shuttle around said pins, and means for rotating said reel as the shuttle travels around said pins to impart a permanent torsional set to the wire.

11. Wire bending apparatus, comprising loop-forming pins, a wire carrying shuttle, means for moving said shuttle around said pins, and a stationary member about which the shuttle moves for imparting a permanent torsional set to the wire.

12. Wire bending apparatus, comprising loop-forming pins, a wire-carrying shuttle, means for moving said shuttle to coil the wire around said pins, and means for operating said shuttle to rotate the wire and impart a permanent torsional set thereto.

13. Wire bending apparatus, comprising loop-forming pins, a wire-carrying shuttle, means for moving said shuttle to coil the wire around said pins, and a stationary member around which said shuttle travels and arranged to rotate the wire and impart a permanent torsional set thereto.

14. Wire bending apparatus, comprising loop-forming pins, a plurality of shuttles, driving members for moving said shuttles around said pins, a stationary member around which said shuttles travel, and a plurality of sets of gearing connected to said stationary member and arranged to operate said shuttles for imparting a permanent torsional set to the wire.

15. Wire bending apparatus, comprising loop-forming pins, a plurality of shuttles, driving members for moving said shuttles around said pins, a stationary member around which said shuttles travel, and a plurality of sets of gearing connected to said stationary member and arranged to operate said shuttles for imparting a permanent torsional set to the wire, said sets of gearing being so arranged as to permit the wire to be twisted in either direction.

16. Wire bending apparatus, comprising loop-forming pins, a wire-carrying shuttle, means for moving said shuttle to coil the wire around said pins, and means for operating said shuttle to impart a permanent torsional set to the wire, said means being so arranged as to produce a twist in either direction.

17. Wire bending apparatus, comprising loop-forming pins, a wire-carrying shuttle, means for moving said shuttle around a figure-8 pathway to coil the wire around said pins, and means for twisting the wire in opposite directions as said shuttles move around the two loops of said figure-8 pathway.

In testimony whereof, I have hereunto set my hand.

FRANK L. O. WADSWORTH.

Witnesses:
 ELBERT L. HYDE,
 GLENN H. LERESCHE.

Copies of this patent may be obtained for five cents each, by addressing the "Commissioner of Patents, Washington, D. C."